United States Patent Office 3,803,303
Patented Apr. 9, 1974

3,803,303
POLYMERIC COMPOSITIONS FOR ATTRACTING COTTON BOLL WEEVILS
Gerald H. McKibben, Rte. 4; Theodore B. Davich, Westview Drive; Richard C. Gueldner, Maple Drive; Dicky D. Hardee, Highway 12 West; and Paul A. Shedin, 202 Arrow Drive, all of Starkville, Miss. 39759
No Drawing. Filed Jan. 27, 1972, Ser. No. 221,417
Int. Cl. A01n 17/14
U.S. Cl. 424—84          14 Claims

ABSTRACT OF THE DISCLOSURE

A synthetically prepared boll weevil sex attractant, two natural plant attractants, and an insect repellent have been formulated so as to include certain glycols and/or derivatives thereof. These formulations, in the form of attractant-containing pellets have been successfully employed to trap and destroy boll weevils for periods up to one week. Because these new formulations are designed to release the active ingredients at controllable rates the effectiveness of the active ingredients is sustained for longer periods of time than those attained in the prior art.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to insect-controlling formulations. More specifically this invention relates to insect-control formulations which contain either a synthetically prepared boll weevil sex attractant, two natural plant attractants or a repellent, and a glycol to yield effective preparations having a sustained release of the active ingredients.

The main object of this invention is to provide a species-specific control method that will not affect non-target insect species or higher animals.

Another object of the invention is to provide a process whereby synthetic and natural attractants, aggregants, and repellents can be formulated so as to have prolonged activity in the field and provide an inexpensive survey and control technique.

A third object of this invention is to provide several effective formulations for use with the overall plan of the invention.

Definitions

Pheromone: The Random House Dictionary of the English Language (1967) defines thusly, "Any of a class of hormonal substances secreted by an individual and stimulating a physiological or behavioral response from an individual of the same species."
Attaclay: A finely ground attapulgus clay.
Methocel: Methyl cellulose ether used in the pharmaceutical trade as a tablet binder—caused the tablet ingredients to bind together into a tablet upon compression.

The invention described herein has been shown to attract cotton boll weevils (*Anthonomus grandis*) and to provide a long enough residual activity to prove economically feasible. Sex pheromones (attractants) of several different insects have been synthesized, and investigative work by these inventors is being continued with others. Each of the synthetic materials possesses potential as a control agent and/or survey tool when formulated in a manner as to render them suitable for field use.

The boll weevil sex pheromone synthesis was reported by J. H. Tumlinson in Science, pp. 1010–2 (1969) in a paper bearing the title "Sex Pheromones Produced by Male Boll Weevil: Isolation, Identification, and Synthesis." It has been noted that the synthetic pheromone while a potent attractant, possesses a very short residual life span. When deposited on firebrick or other absorptive materials, it is active for periods only up to about 24 hours in the field. G. M. McKibben et al., used various polymers, resins, and waxes to formulate this attractant into tablets which give a slow, sustained release of the attractant over long periods of time. These preliminary studies were reported in "Slow Release of Grandlure, the Synthetic Pheromone of the Boll Weevil," which was published in the J. of Economic Entomology, vol. 64, pp. 317–19, 1970. At the time, polyethylene glycol with a molecular weight of about 1000 was considered superior to all other compounds tested as slow release additives, and a tablet preparation containing this material showed no decrease in activity after aging 128 hours under simulated field conditions.

In general, this invention can best be described as an insect control, eradicating, or repelling means and method comprising the use of certain glycols and/or derivatives thereof in combination with certain biologically active ingredients to effect a gradual release of the vapors of the said biologically active ingredient over a longer period of time than would be possible without the use of the selected glycol or derivative thereof.

Specifically, the invention involves mixing a biologically-active attractant or repellent with polyethylene glycol, preferably with a molecular weight of from 1000 to 20,000. These chemical mixtures have the ability to attract or repel insects with the aid of polyethylene glycol, which provides the sustained release of the biologically-active ingredients of the formulation.

The actual preparation can be carried out with variations, and the following examples are provided to illustrate certain preferred embodiments. These examples should not be construed as limitations in any manner whatever.

EXAMPLE 1

A formulation was prepared by mixing 0.0072 g. of the synthetic boll weevil sex attractant with 25.0 g. of 12.5% (w./v.) polyethylene glycol 1000/dichloromethane solution. Then 6 g. of a mixture of Attaclay 20 (any finely ground mineral clay would probably serve as well) and Methocel 65 Hg 50/50 was added and mixed. The solvent was allowed to evaporate, after which the dry material was weighed into 0.75 g. portions, which contained the desired amount of attractant, and pressed into ½ inch diameter tablets using a tablet press. After aging for 128 hours at 90° F. in the laboratory, under a heat lamp, these tablets received a higher attraction response than the standard, which consisted of fresh, unformulated attractant. Also, the response to this formulation did not decrease over the 128 hour period.

EXAMPLE 2

0.5 ml. of the following solution was applied to cotton dental rolls cut to ¾ inch length:

|  | Percent by weight |
|---|---|
| Polyethylene glycol | 20 |
| Glycerol | 25 |
| Water | 12.5 |
| Methanol | 42.3 |
| Synthetic boll weevil attractant | 0.2 |

Glycerol was used to aid in retention of the water which has been found to aid in the dispersal of the attractant vapors. Methanol was used to dilute the solution to facilitate application to the cotton dental rolls. In a field test with traps, this formulation attracted 195 boll weevils in one week, while the control (unbaited traps) captured 31 at the same location in the same length of time.

EXAMPLE 3

Capsules were prepared by pouring 0.60 g. molten polyethylene glycol 1000 containing 800 μ g. synthetic boll weevil attractant into empty gelatin capsules. These capsules were bioassayed in laboratory olfactometers. Even after againg one week at room temperature, they received a higher response than the standard (fresh, unformulated attractant). The unformulated attractant was all lost through evaporation and oxidation after a few hours when exposed to the air.

EXAMPLE 4

The methods of Example 2 were used except that in place of polyethylene glycol 1000, the following compounds were used:

|  | Attractancy (percent of Standard) [1] |
|---|---|
| ethylene glycol | 6 |
| diethylene glycol | 26 |
| propylene glycol | 35 |
| polypropylene glycol 2000 | 53 |
| polyethylene glycol 4000 monostearate | 83 |
| polyethylene glycol 600 distearate | 35 |
| polyethylene glycol 380–420 | 50 |
| polyethylene glycol 6000–7500 | 59 |
| polyethylene glycol 20,000 | 135 |

[1] The standard formulation of Example 2, 100% would be as good as the standard, 50% wuld be half as good, etc.

EXAMPLE 5 p-Dichlorobenzene, which is used to protect garments from clothes moths, carpet beetles, wax moths, and other insects, is a solid which sublimes rapidly when exposed to the air. The following formulations were prepared to illustrate how we have prolonged its period of activity.

Two samples, about 11 g. each, were prepared of each formulation. Samples were exposed at ordinary room temperature for 36 days and weighed at regular intervals. (See Tables I and II below.)

TABLE I

| Code | Formulation |
|---|---|
| 1 | 25% p-dichlorobenzene, 75% polyethylene glycol 20,000. |
| 2 | 50% p-dichlorobenzene, 50% polyethylene glycol 20,000. |
| 3 | 75% p-dichlorobenzene, 25% polyethylene glycol 20,000. |
| 4 | 25% p-dichlorobenzene, 75% paraffin wax. |
| 5 | 50% p-dichlorobenzene, 50% paraffin wax. |
| 6 | 75% p-dichlorobenzene, 25% paraffin wax. |
| 7 | 100% p-dichlorobenzene. |

TABLE II

| Code [1] | Percent loss of p-dichlorobenzene after indicated time of— | | | | | |
|---|---|---|---|---|---|---|
|  | 1 day | 2 days | 4 days | 11 days | 25 days | 36 days |
| 1 | 0 | 0 | 0 | 0 | 0 | 16 |
| 2 | 4 | 4 | 10 | 18 | 34 | 50 |
| 3 | 15 | 21 | 32 | 55 | 76 | 88 |
| 4 | 4 | 4 | 4 | 4 | 12 | 20 |
| 5 | 18 | 36 | 46 | 78 | 96 | 100 |
| 6 | 81 | 97 | 96 | 97 | 97 | 99 |
| 7 | 99 | 100 |  |  |  |  |

[1] Reference Table I formulations.

Conclusion: These results show the efficiency with which the polyethylene glycol retains the p-dichlorobenzene. The rate of release can be critically adjusted by varying the ratio of poyethylene glycol to p-dichlorobenzene.

EXAMPLE 6

Two plant attractants which were used with considerable degree of attractancy with respect to the boll weevil are caryophylline oxide and β-bisabalol. The manner of preparation and application was this: 0.02–0.2 ml. of a 1:1 mixture of these materials were applied to cotton dental rolls containing the ingredients of Example 2. In field tests, the formulation containing caryophylline oxide and β-bisabalol attracted 25% more boll weevils than the same formulation without these materials.

We claim:

1. A composition useful for attracting the boll weevil *Anthonomus grandis* Boheman to a trap, comprising an effective amount of:
   (a) about 0.2 part by weight of Grandlure synthetic boll weevil pheromone for attracting the boll weevil;
   (b) about 20 parts by weight of a glycol selected from the group consisting of diethylene glycol, propylene glycol, polyethylene glycol 4000 monostearate, polypropylene glycol 2000, and polyethylene glycol having a molecular weight of from 1000 to 20,000 for decelerating the evaporation rate of said Grandlure and thereby extending its residual life span and consequently, its effectiveness;
   (c) about 12.5 parts by weight of water for aiding in the dispersal of the Grandlure vapors;
   (d) about 25 parts by weight of glycerol for aiding in the retention of said water; and
   (e) about 42.3 parts by weight of methanol for dilution of the formulation to facilitate its application to the site to which the boll weevil is to be attracted.

2. The composition of claim 1 wherein the glycol is diethylene glycol.

3. The composition of claim 1 wherein the glycol is propylene glycol.

4. The composition of claim 1 wherein the glycol is polyethylene glycol 4000 monostearate.

5. The composition of claim 1 wherein the glycol is polypropylene glycol 2000.

6. The composition of claim 1 wherein the glycol is polyethylene glycol of about from 1000 to 20,000 molecular weight.

7. A composition useful for attracting the boll weevil *Anthonomus grandis* Boheman to a trap, comprising an effective amount of:
   (a) about 0.2 part by weight of a natural plant attractant selected from the group consisting of caryophylline oxide and beta-bisabalol for attracting the boll weevil;
   (b) about 0.2 part by weight of Grandlure synthetic boll weevil pheromone as an additional attractant for the boll weevil;
   (c) about 20 parts by weight of a glycol selected from the group consisting of diethylene glycol, propylene glycol, polyethylene glycol 4000 monostearate, polypropylene glycol 2000, and polyethylene glycol having a molecular weight of from 1000 to 20,000 for plant attractant and said Grandlure and thereby extending their residual life spans and consequently their effectiveness;
   (d) about 12.5 parts by weight of water for aiding in the dispersal of the natural plant attractant and Grandlure vapors;
   (e) about 25 parts by weight of glycerol for aiding in the retention of said water; and
   (f) about 42.1 parts by weight of methanol for dilution of the formulation to facilitate its application to the site to which the boll weevil is to be attracted.

8. The composition of claim 7 wherein the natural plant attractant is caryophylline oxide.

9. The composition of claim 7 wherein the natural plant attractant is β-bisabalol.

10. The composition of claim 7 wherein the glycol is diethylene glycol.

11. The composition of claim 7 wherein the glycol is propylene glycol.

12. The composition of claim 7 wherein the glycol is polyethylene glycol 4000 monostearate.

13. The composition of claim 7 wherein the glycol is polypropylene glycol 2000.

14. The composition of claim 7 wherein the glycol is polyethylene glycol having a molecular weight of from 1000 to 20,000.

References Cited

FOREIGN PATENTS

| | | | |
|---|---|---|---|
| 955,680 | 4/1964 | Great Britain | 424—84 |
| 44,320 | 1969 | Japan | 424—84 |
| 20,738 | 1964 | Japan | 424—84 |

OTHER REFERENCES

McKibben et al., J. Econ. Ent., vol. 64 (1971), pp. 317–19.

Hardee et al., J. Econ. Ent. vol. 60 No. 1 (1967), pp. 169–71.

VINCENT D. TURNER, Primary Examiner

U.S. Cl. X.R.

424—78, 95, Dig. 10

PO-1050
(5/69)

UNITED STATES PATENT OFFICE
CERTIFICATE OF CORRECTION

Patent No. 3,803,303      Dated April 9, 1974

Inventor(s) Gerald H. McKibben, Theodore B. Davich, Richard C. Gueldner, Dicky D. Hardee and Paul A. Shedin It is certified that error appears in the above-identified patent and that said Letters Patent are hereby corrected as shown below:

The following statement should appear in the heading in col. 1:

Assignee: The United States of America, as represented by the Secretary of Agriculture.

Signed and sealed this 10th day of September 1974.

(SEAL)
Attest:

McCOY M. GIBSON, JR.
Attesting Officer

C. MARSHALL DANN
Commissioner of Patents